(12) United States Patent
Lin

(10) Patent No.: US 12,128,748 B1
(45) Date of Patent: Oct. 29, 2024

(54) MOUNTING PLATFORM FOR SUNSHADE OF AUTOMOBILE PANORAMIC SUNROOF

(71) Applicant: Vitality (Shanghai) Information Technology Co., Ltd., Shanghai (CN)

(72) Inventor: Yang Lin, Shanghai (CN)

( * ) Notice: Subject to any disclaimer, the term of this patent is extended or adjusted under 35 U.S.C. 154(b) by 0 days.

(21) Appl. No.: 18/430,614

(22) Filed: Feb. 1, 2024

(51) Int. Cl.
*B60J 7/00* (2006.01)

(52) U.S. Cl.
CPC .................... *B60J 7/0007* (2013.01)

(58) Field of Classification Search
CPC ...... B60J 7/0007; B60J 7/0015; B60J 1/2047; B60J 1/2013; B60J 1/2036; B60J 1/2044; B60J 1/2066; B60J 3/023; B60J 3/2013; B60J 3/02; E06B 9/40; E06B 9/54; E06B 9/56

See application file for complete search history.

(56) References Cited

U.S. PATENT DOCUMENTS

| | | | | |
|---|---|---|---|---|
| 7,748,433 | B2 * | 7/2010 | Huang | B60J 1/2011 160/370.21 |
| 10,081,227 | B1 * | 9/2018 | Mao | B60J 1/2041 |
| 2014/0041816 | A1 * | 2/2014 | Yamase | B60J 1/2086 160/382 |
| 2014/0102647 | A1 * | 4/2014 | Ross | B60J 1/2086 160/370.21 |
| 2014/0265423 | A1 * | 9/2014 | Sia, Jr. | B60J 1/2047 296/97.9 |
| 2018/0251013 | A1 * | 9/2018 | Ibrahim | B62D 65/02 |

FOREIGN PATENT DOCUMENTS

KR    20230129716 A  *  9/2023

OTHER PUBLICATIONS

Machine translation KR20230129716 (Year: 2023).*

* cited by examiner

*Primary Examiner* — Abe Massad
*Assistant Examiner* — Jeremy C Ramsey
(74) *Attorney, Agent, or Firm* — Hawaii Patent Services; Nathaniel K. Fedde; Kenton N. Fedde

(57) ABSTRACT

Disclosed is a mounting platform for a sunshade of an automobile panoramic sunroof, which comprises a positioning part, a mounting part, a clamping groove and a magnetic component; the positioning part comprises a base plate and a limit plate, wherein the base plate comprises an upper end face and a lower end face, and the limit plate is arranged above the upper end face; the mounting part comprises a top surface and a bottom surface, and the bottom surface is lower than the lower end face; the lower end face is provided with a blocking part, which comprises a starting end and a terminating end, wherein the terminating end is lower than the starting end, and the terminating end extends towards the lower end face to form a terminating face; a clamping groove is formed between the terminating face, the lower end face and the mounting part.

15 Claims, 10 Drawing Sheets

MOUNTING PLATFORM FOR SUNSHADE OF AUTOMOBILE PANORAMIC SUNROOF

TECHNICAL FIELD

The present invention relates to the technical field of automobile accessories, in particular to a mounting platform for a sunshade of an automobile panoramic sunroof.

BACKGROUND

The mounting platform for a sunshade of an automobile panoramic sunroof is a small accessory for fixing automobile curtain. With the structure of buckle, automobile curtain can be easily installed and disassembled, so as to achieve the purposes of shielding sunlight, protecting privacy and beautifying the interior environment of automobile.

When car owners need to block the sun and protect their privacy, they used to have to rely on traditional curtains or sun visors. However, traditional curtains or sun visors are usually bulky, difficult to install and unattractive in appearance. For example, the U.S. patent with application number of U.S. Ser. No. 13/833,437 discloses a sunshade hook, which has the problem of inconvenient mounting; similarly, the U.S. patent with the application number of U.S. Ser. No. 11/414,960 discloses that a support assembly for a folding automobile hood also has the problems of difficult mounting and aesthetic appearance.

Therefore, based on the above problems, it is necessary for us to put forward a brand-new automobile sunshade buckle. The mounting platform of an automobile panoramic sunroof sunshade solves these problems by providing a compact and easy-to-install solution, thus enhancing the appearance of the interior of the automobile, providing effective sun protection and privacy protection, and can be disassembled when not needed.

SUMMARY

The present invention provides a mounting platform for a sunshade of an automobile panoramic sunroof, which includes a positioning part, a mounting part, a clamping groove arranged between the positioning part and the mounting part, and a magnetic component provided in the mounting part; and wherein the positioning part comprises a base plate comprising an upper end face and a lower end face, and at least one limit plate, wherein the base plate is further provided with at least one through hole having a front end and a rear end, wherein the limit plate is disposed above the upper end face and extends along a parabolic path from the front end towards the rear end; and wherein the mounting part comprises a top surface and a bottom surface, and the bottom surface is lower than the lower end face; and wherein the lower end face is provided with a blocking part comprising a starting end and a terminating end, wherein the terminating end is lower than the stating end, the terminating end extends in the direction of the lower end face and forms a terminating face; and wherein the terminating face, the lower end face and the mounting part form a clamping groove therebetween.

The present invention provides a mounting platform for a sunshade of an automobile panoramic sunroof, which includes a positioning part, a mounting part, a clamping groove arranged between the positioning part and the mounting part, and a magnetic component provided in the mounting part; and wherein, the positioning part comprises a base plate and at least one limit plate, wherein the base plate comprises an upper end face and a lower end face, and the limit plate is arranged above the upper end face and has a parabolic cross section; and wherein, the mounting part comprises a top surface, a bottom surface and a mounting cavity, and the mounting cavity extends from the top surface to the bottom surface, wherein the mounting cavity comprises a lower opening, and the magnetic component is arranged in the mounting cavity, wherein a transverse width of the magnetic component is greater than that of the lower opening; and wherein the bottom surface is lower than the lower end face; and wherein, the lower end face is provided with a blocking part, and the blocking part comprises a starting end and a terminating end, wherein the terminating end is lower than the starting end, and the terminating end extends toward the lower end surface and forms a terminating face; and wherein, the terminating face, the lower end face and the mounting part form a clamping groove therebetween.

The present invention also provides a shading method for an automobile panoramic sunroof, comprising: providing a mounting platform for a sunshade of an automobile panoramic sunroof and a sun visor;

wherein, the platform comprises a positioning part, a mounting part, a clamping groove arranged between the positioning part and the mounting part, and a magnetic component provided in the mounting part; and wherein the positioning part comprises a base plate comprising an upper end face and a lower end face, and at least one limit plate, wherein the base plate is further provided with at least one through hole having a front end and a rear end, wherein the limit plate is disposed above the upper end face and extends along a parabolic path from the front end towards the rear end; and wherein the mounting part comprises a top surface and a bottom surface, and the bottom surface is lower than the lower end face; and wherein the lower end face is provided with a blocking part comprising a starting end and a terminating end, wherein the terminating end is lower than the stating end, the terminating end extends in the direction of the lower end face and forms a terminating face; and wherein the terminating face, the lower end face and the mounting part form a clamping groove therebetween;

wherein magnets are arranged around the sun visor; and the shading method comprises the following steps:

prying up an interior trim panel around the automobile panoramic sunroof;

allowing the upper end face of the platform to face the sunroof, and inserting the positioning part into a gap between the interior trim panel and an automotive sheet metal;

moving the platform so that the edge of the interior trim panel is embedded in the clamping groove;

adsorbing the magnets on the sun visor to the magnetic component on the platform.

BRIEF DESCRIPTION OF DRAWINGS

In order to explain the technical solution of this application more clearly, the drawings needed in the implementation will be briefly introduced below. Obviously, the drawings described below are only some implementations of this application. For those skilled in the art, other drawings can be obtained according to these drawings without creative work.

Figure 1:
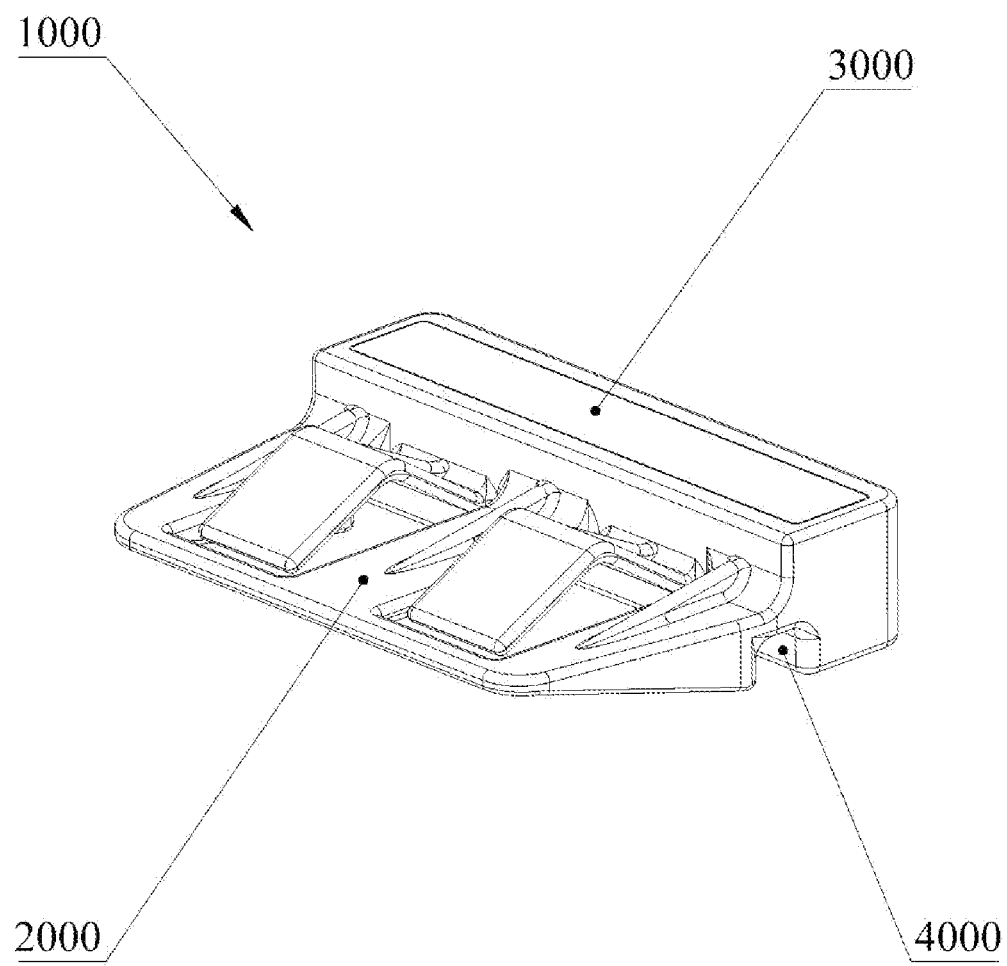
FIG. 1 is a schematic diagram of a platform.

In the figures:
Platform (1000); Positioning part (2000); Base plate (2001); Limit plate (2002); Upper end face (2003); Lower end face (2004); Through hole (2005); Front end (2006); Back end (2007); Peak (2008); First reinforcing rib (2009); Second reinforcing rib (2010); First end (2011); Second end (2012); Mounting part (3000); Top surface (3001); Bottom surface (3002); Side surface (3003); Mounting cavity (3004); Lower opening (3005); Mounting cover (3006); Fixing post (3007); Assembly groove (3008); Fixing hole (3009); Clamping groove (4000); Blocking part (4001); Starting end (4002); Terminating end (4003); Terminating face (4004); Inclined part (4005); Magnetic component (5000); Magnetic member (5001); Protective shell (5002); Accommodating part (5003); Automotive sheet metal (6000); Interior trim panel (6001); Inner edge of the interior trim panel (6002); Sun visor (6003); Magnet (6004).

DESCRIPTION OF EMBODIMENTS

In the following, the technical solutions in the embodiment of the application will be clearly and completely described with reference to the drawings in the embodiment of the application. Obviously, the described embodiment is only a part of the embodiment of the application, but not the whole embodiment. Based on the embodiments in this application, all other embodiments obtained by those skilled in the art without creative labor belong to the protection scope of this application.

Reference to "an example" or "an embodiment" herein means that a particular feature, structure or characteristic described in connection with an embodiment or an embodiment can be included in at least one embodiment of this application. The appearance of this phrase in various places in the specification does not necessarily refer to the same embodiment, nor is it an independent or alternative embodiment mutually exclusive with other embodiments. It is understood explicitly and implicitly by those skilled in the art that the embodiments described herein can be combined with other embodiments.

In this specification, for the sake of convenience, words and expressions indicating orientation or positional relationship such as "middle", "upper", "lower", "front", "rear", "vertical", "horizontal", "top", "inner" and "outer" are used to illustrate the positional relationship of constituent elements with reference to the attached drawings, only for the convenience of description. The positional relationship of the constituent elements is appropriately changed according to the direction of the described constituent elements. Therefore, it is not limited to the words and expressions described in the specification, and can be replaced appropriately according to the situation.

As shown in FIGS. 1 to 8, the present invention provides a mounting platform for a sunshade of an automobile panoramic sunroof. The platform 1000 includes a positioning part 2000, a mounting part 3000, a clamping groove 4000 arranged between the positioning part 2000 and the mounting part 3000, and a magnetic component 5000 arranged in the mounting part 3000.

Wherein, the positioning part 2000 fixes the platform on the edge of the automobile sunroof, and limits the moving range of the platform. The positioning part 2000 comprises a base plate 2001 and at least one limit plate 2002, wherein the base plate 2001 comprises an upper end face 2003 and a lower end face 2004, wherein the base plate 2001 is also provided with at least one through hole 2005, and the through hole 2005 has a front end 2006 and a back end 2007, wherein the limit plate 2002 is arranged above the upper end face 2003 and extends along a parabolic path from the front end 2006 to the back end 2007.

Wherein, the mounting part 3000 installs the sunshade on the platform, and attracts the sunshade by magnetic force to prevent it from falling. The mounting part 3000 includes a top surface 3001, a bottom surface 3002 and a mounting cavity 3004 extending from the top surface 3001 to the bottom surface 3002, wherein the mounting cavity 3004 includes a lower opening 3005, and the magnetic component 5000 is arranged in the mounting cavity 3004, wherein the transverse width W1 of the magnetic component 5000 is greater than the transverse width w2 of the lower opening 3005; wherein the bottom surface 3002 is lower than the lower end face 2004.

The lower end face 2004 is provided with a blocking part 4001, which comprises a starting end 4002 and a terminating end 4003, wherein the terminating end 4003 is lower than the starting end 4002, and the terminating end 4003 extends towards the lower end face 2004 to form a terminating face 4004; A clamping groove 4000 is formed between the end face 4004, the lower end face 2004 and the mounting part 3000. The clamping groove 4000 is used to be embedded in the edge of the interior trim panel of the automobile, and the blocking part 4001 prevents the platform from slipping off the fixing member of the sunroof of the automobile.

In this embodiment, the base plate 2001 is also provided with two through holes 2005, and two limit plates 2002 extend from the front end 2006 to the back end 2007, and the limit plates 2002 have parabolic cross sections.

In other embodiments, the base plate is not limited to being provided with two through holes and two limit plates, but also can be provided with one, three, four, five and any desired number of through holes and limit plates.

In other embodiments (not shown in the figure), the limit plate is not limited to having a parabolic cross section, but can also be set into a triangle, a quadrangle, a circle, an ellipse, a "V" shape, a "U" shape and any desired geometric shape.

As shown in FIGS. 1 to 6, in this embodiment, the limit plate 2002 has a peak 2008, which is the highest turning point of the limit plate 2002; The limit plate 2002 is provided with a first reinforcing rib 2009 which extends from the upper end face 2003 to the peak part 2008. In this embodiment, the peak 2008 is set as a rounded corner, and in other embodiments, it can be set as a sharp corner.

In this embodiment, the limit plate 2002 is provided with a first reinforcing rib 2009. In other embodiments (not shown in the figure), the limit plate is not limited to being provided with one first reinforcing rib, but also can be provided with two, three, four and any number of first reinforcing ribs.

Figure 2:
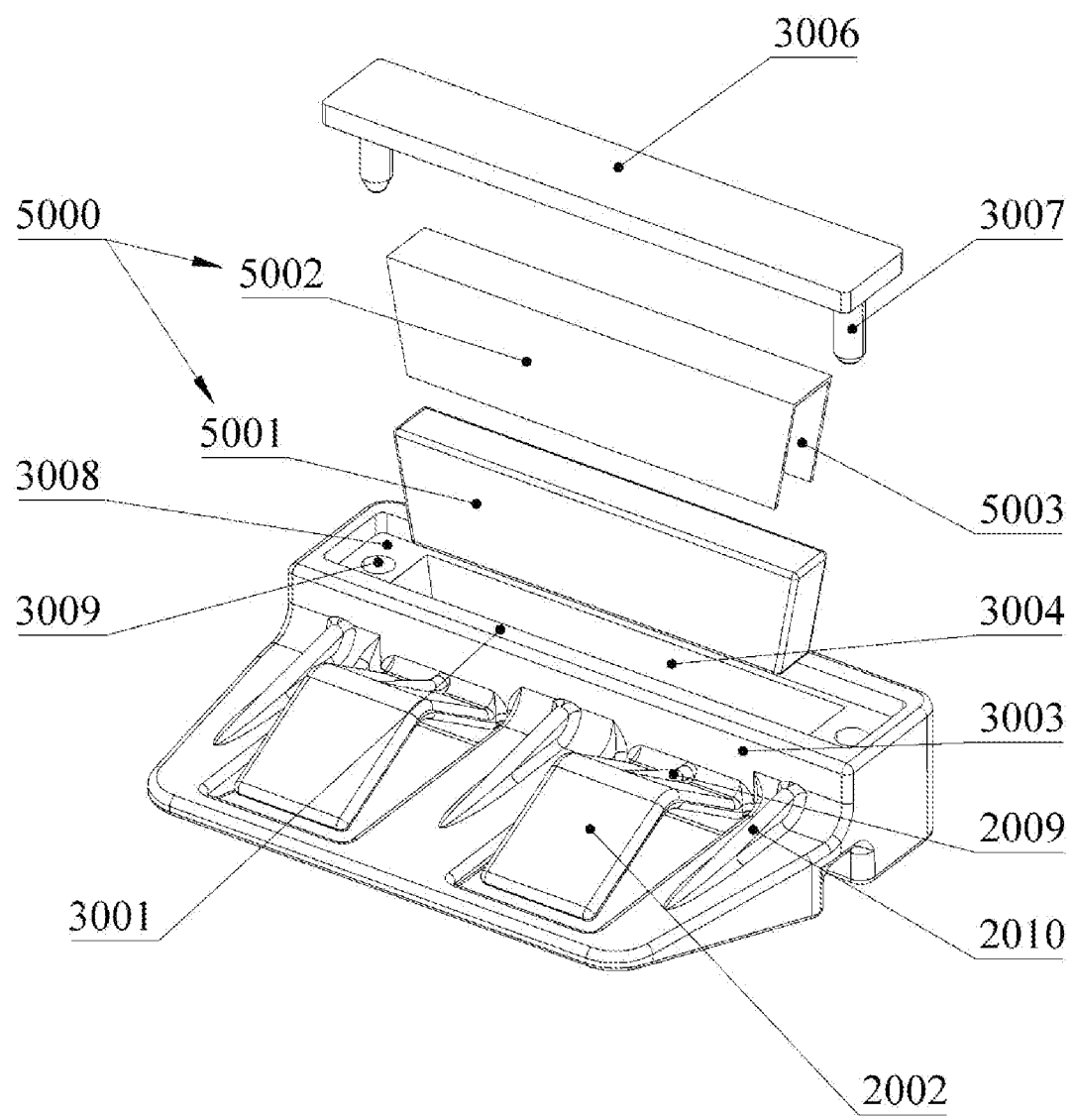
FIG. 2 is an explosion diagram of the platform.
Figure 3:
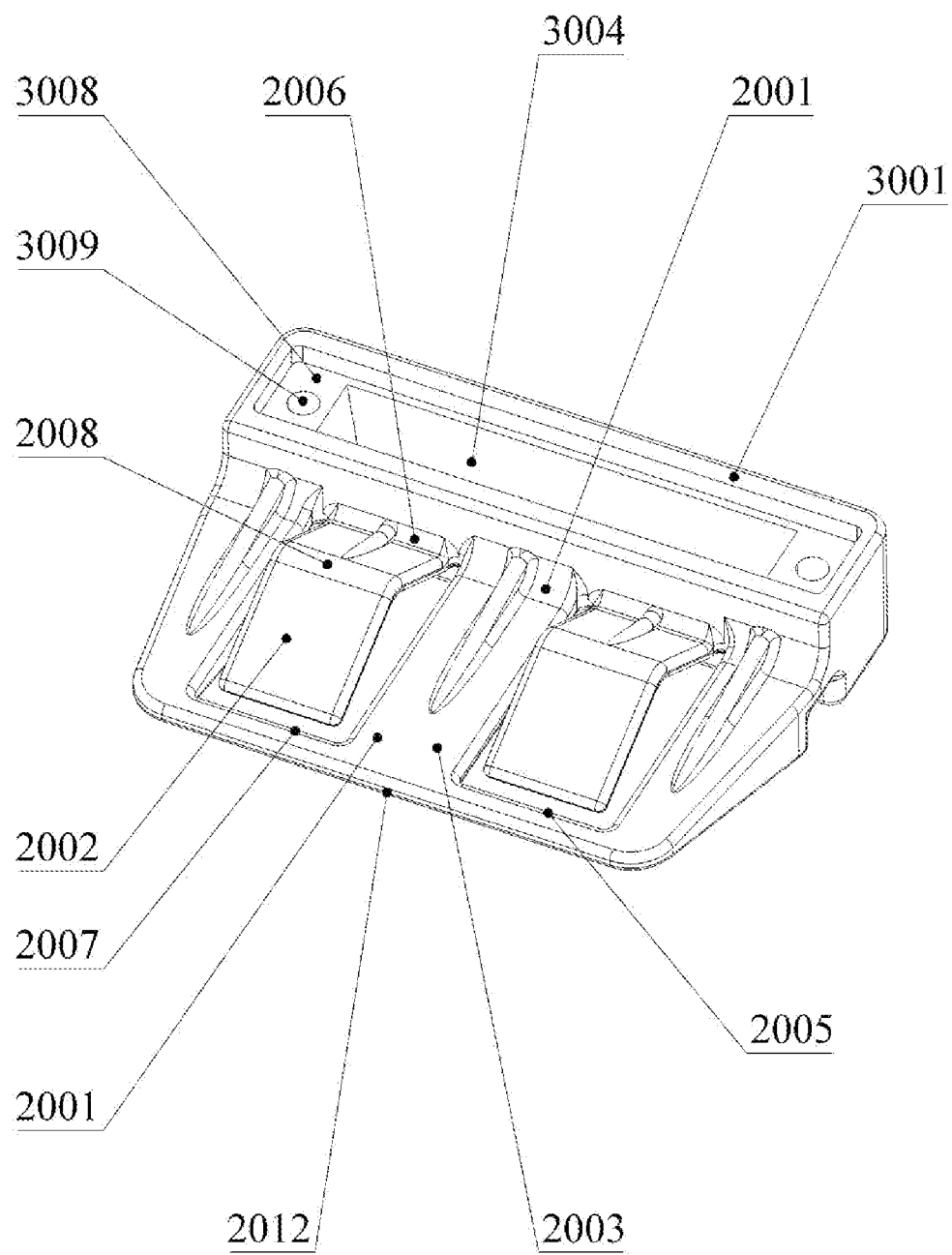
FIG. 3 is a partial schematic view of the platform.
Figure 4:
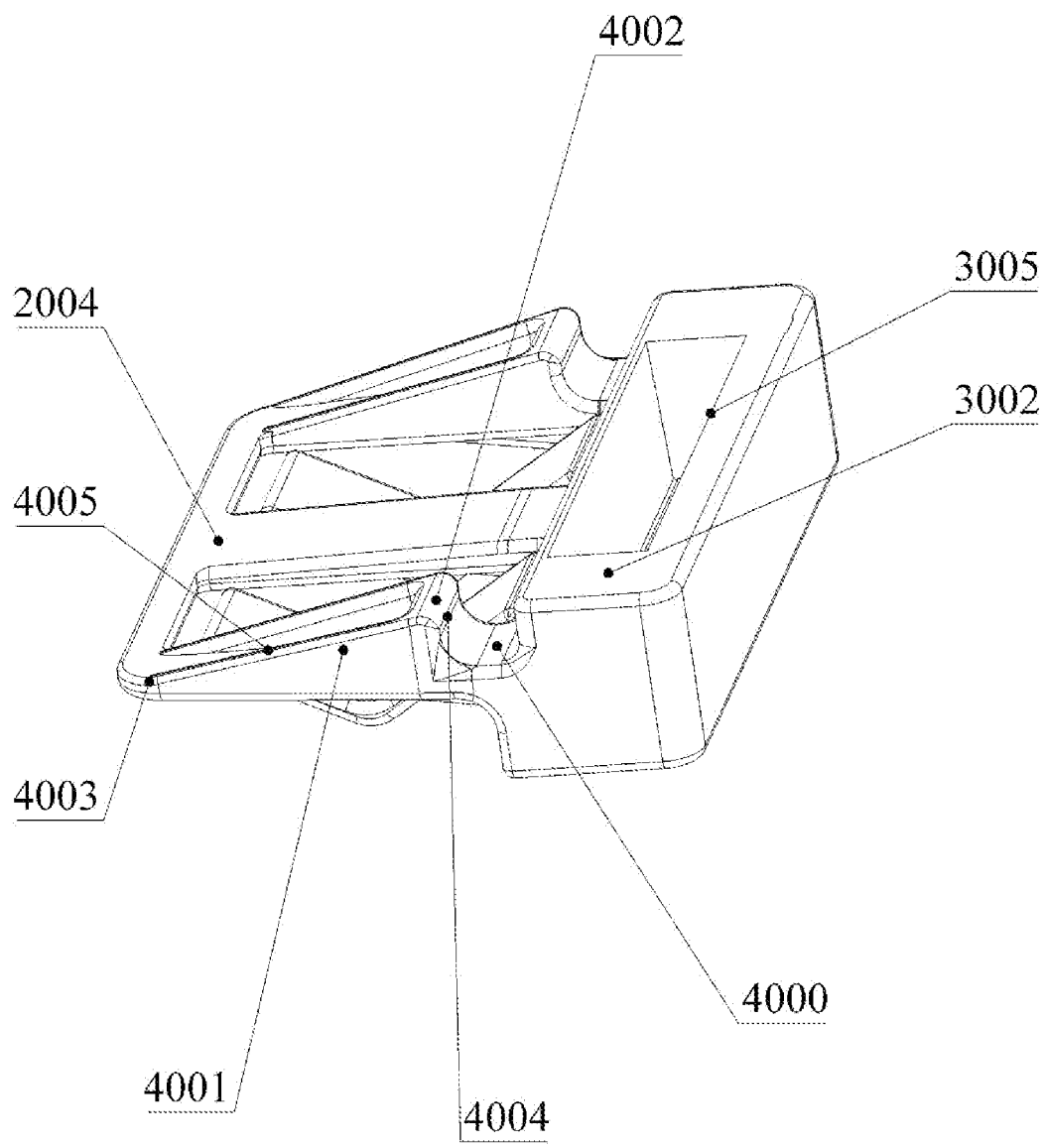
FIG. 4 is another schematic view of FIG. 3.
Figure 5:
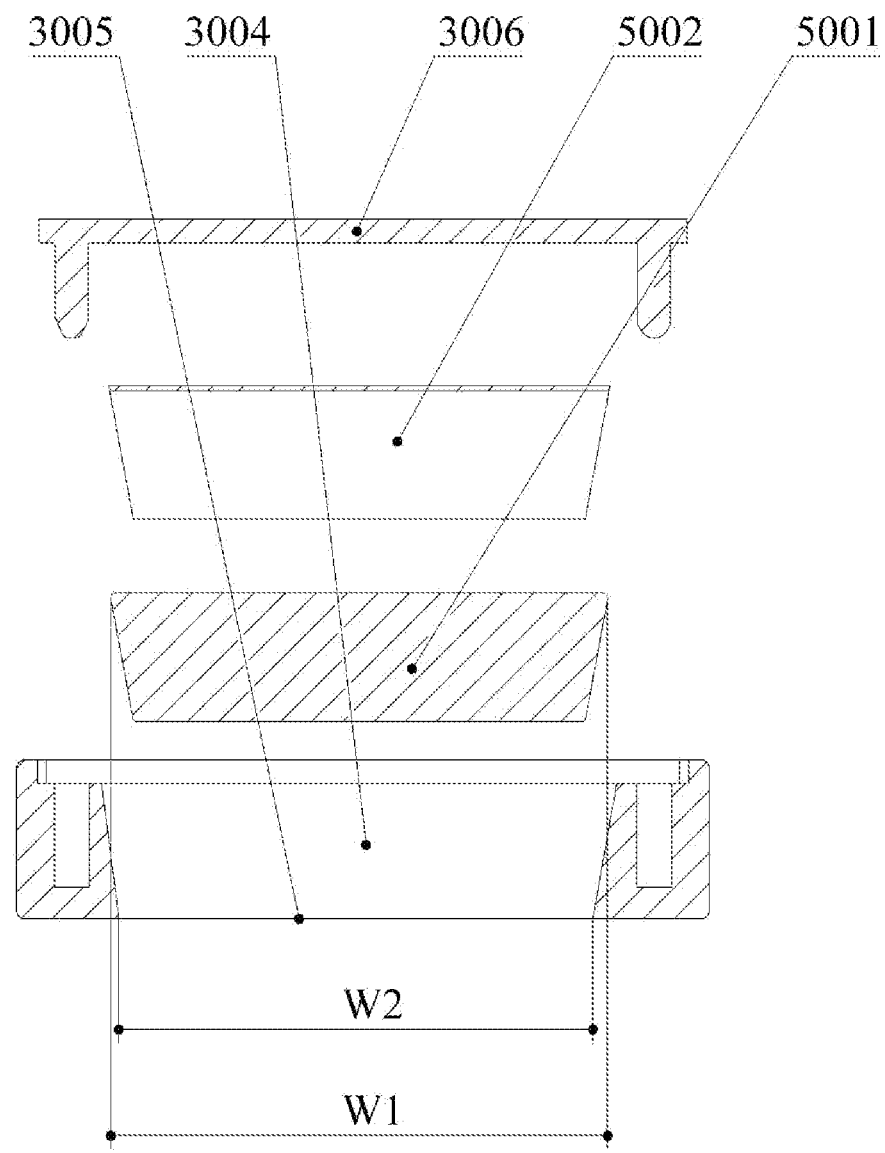
FIG. 5 is a sectional view of FIG. 2.
Figure 6:
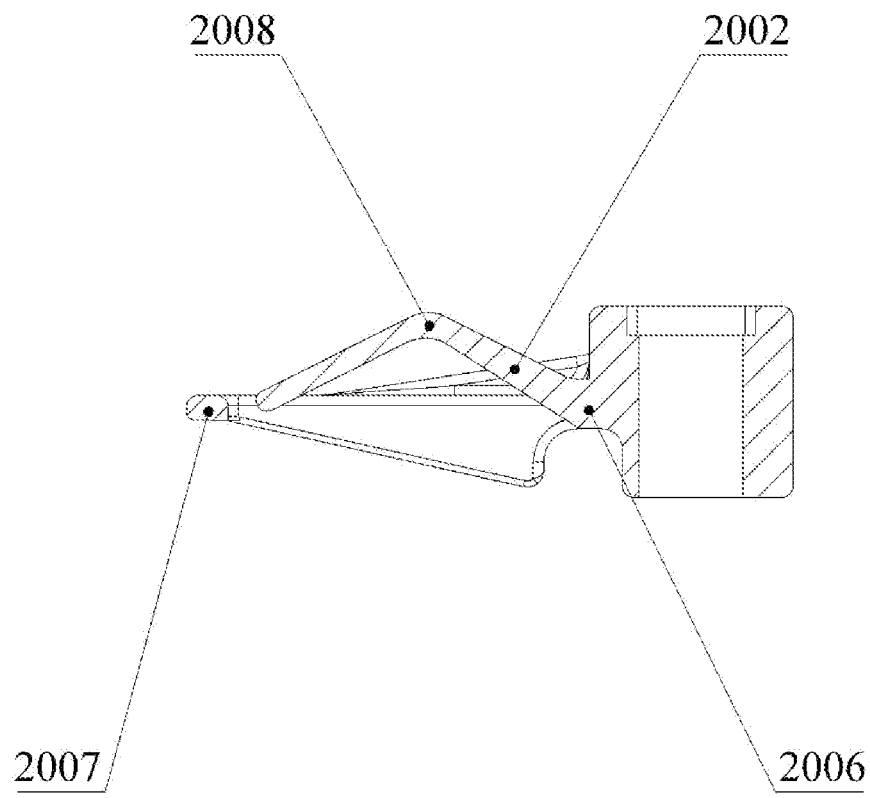
FIG. 6 is a sectional view of FIG. 3.
Figure 7:
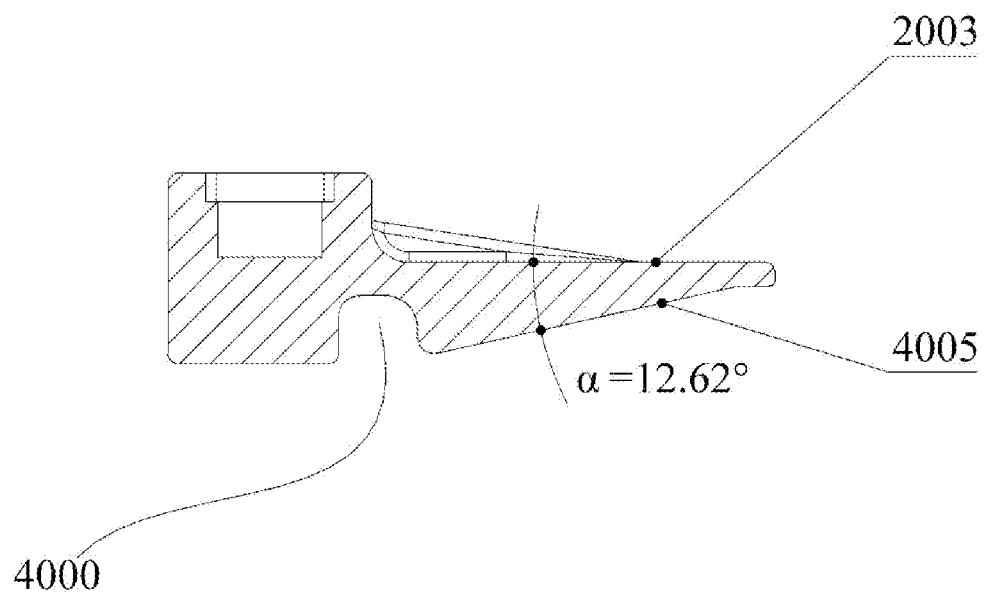
FIG. 7 is another sectional view of FIG. 3.

As shown in FIGS. 1 to 2, in this embodiment, the mounting part 3000 further includes a side surface 3003; a second reinforcing rib 2010 is provided between the mounting part 3000 and the upper end face 2003, and the second reinforcing rib 2010 extends from the side surface 3003 to the upper end face 2003.

In this embodiment, three second reinforcing ribs 2010 are provided between the mounting part 3000 and the upper end face 2003. In other embodiments (not shown in the figure), it is not limited to providing three second reinforcing ribs between the mounting part and the upper end face, but one, two, four, five and any number of second reinforcing ribs may be provided.

As shown in FIGS. 1 to 2, in this embodiment, the mounting part 3000 further includes a mounting cover 3006 covering the mounting cavity 3004; the mounting cover 3006 is provided with at least one fixing post 3007, and the mounting part 3000 is provided with an assembly groove 3008, which corresponds to the mounting cover 3006, and at least one fixing hole 3009 is provided in the assembly groove 3008, and the fixing hole 3009 corresponds to the fixing post 3007.

In this embodiment, the mounting cover 3006 is fixedly connected with the fixing hole 3009 through the fixing post 3007. In other embodiments (not shown in the figure), the mounting cover is not limited to forming the fixed connection by the fixed posts and the fixed holes, but can also set to be screw connection, pin connection, rivet connection, snap connection, hook and loop connection and any desired connection mode.

In this embodiment, the mounting cover 3006 is provided with two fixing posts 3007, which are respectively arranged at both ends of the mounting cover 3006. In other embodiments (not shown in the figure), the mounting cover is not limited to having two fixing posts, but can also be set to have one, three, four, five and any number of fixing posts as desired.

As shown in FIGS. 1 to 5, in this embodiment, the magnetic component 5000 includes a magnetic member 5001 and a protective shell 5002, which corresponds to the magnetic member 5001, and the protective shell 5002 is provided with an accommodating part 5003, and the magnetic member 5001 is arranged in the accommodating part.

In this embodiment, the magnetic member 5001 and the protective shell 5002 are arranged in a trapezoidal shape. In other embodiments (not shown in the figure), the magnetic member and the protective shell are not limited to being trapezoidal, but can also be triangular, quadrangle, circular, semicircular, elliptical and any desired geometric shapes.

In this embodiment, the magnetic component 5000 and the mounting cavity 3004 are arranged in corresponding shapes to form a fixed connection, wherein the transverse width W1 of the magnetic component 5000 is greater than the transverse width W2 of the lower opening 3005. In other embodiments (not shown in the figure), the magnetic component 5000 and the mounting cavity 3004 are not limited to being fixedly connected in this way, but can also be set to be a screw connection, pin connection, rivet connection, snap connection, hook and loop connection and other desired connection modes.

As shown in FIGS. 1 to 7, in this embodiment, the blocking part 4001 includes an inclined part 4005, and there is a certain angle α between the upper end face 2003 and the inclined part 4005, and the range of the angle $10°<α<30°$. In other embodiments (not shown in the figure), it can also be set to $0°<α<15°$, $20°<α<45°$, $40°<α<60°$ and any desired angle range.

Figure 8:
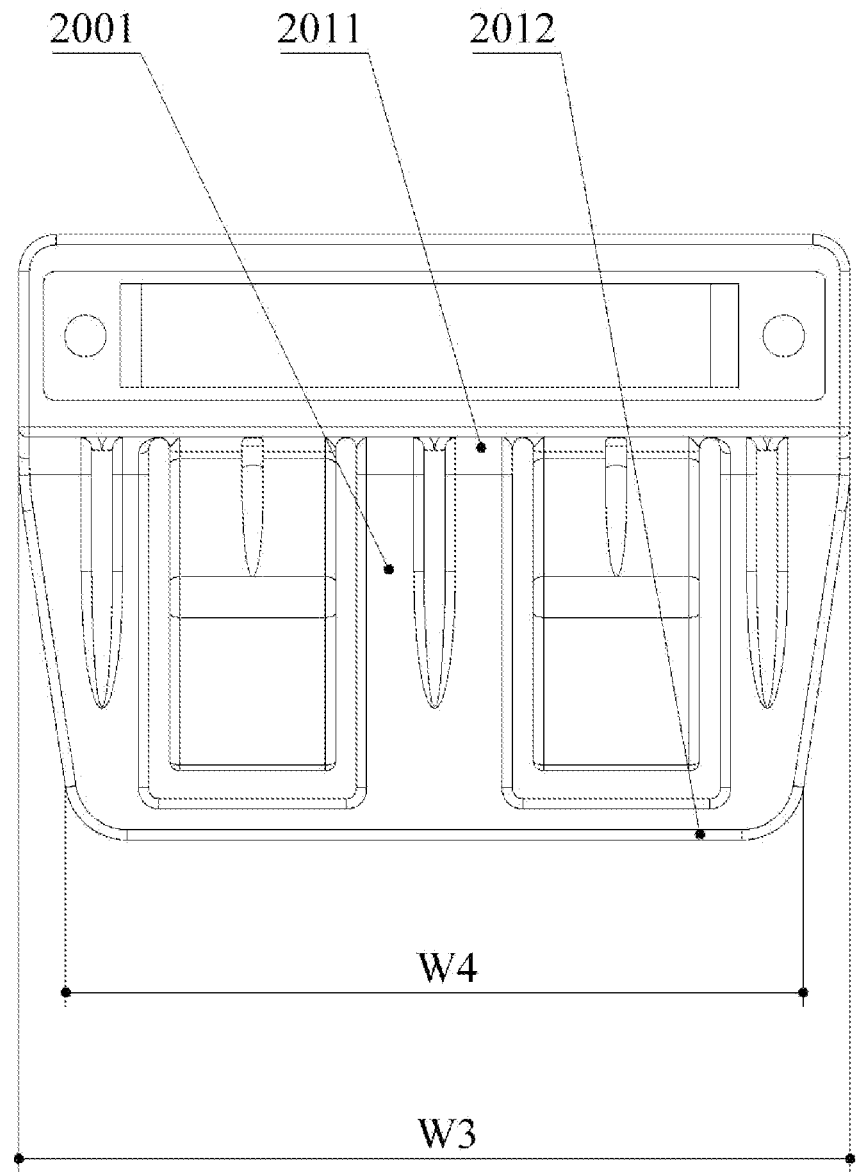
FIG. 8 is a top view of the platform.

As shown in FIG. 8, in this embodiment, the base plate 2001 includes a first end part 2011 and a second end part 2012, wherein the first end part 2011 is an end close to the mounting part 3000 and the second end part 2012 is an end far from the mounting part 3000; the transverse width W3 of the first end part 2011 is greater than the transverse width W4 of the second end part 2012.

In other embodiments (not shown in the figure), the transverse width W3 of the first end part is not limited to being greater than the transverse width W4 of the second end part. The base plate can be set into a circle, a quadrangle, an ellipse, and any desired geometric shape.

Figure 10:
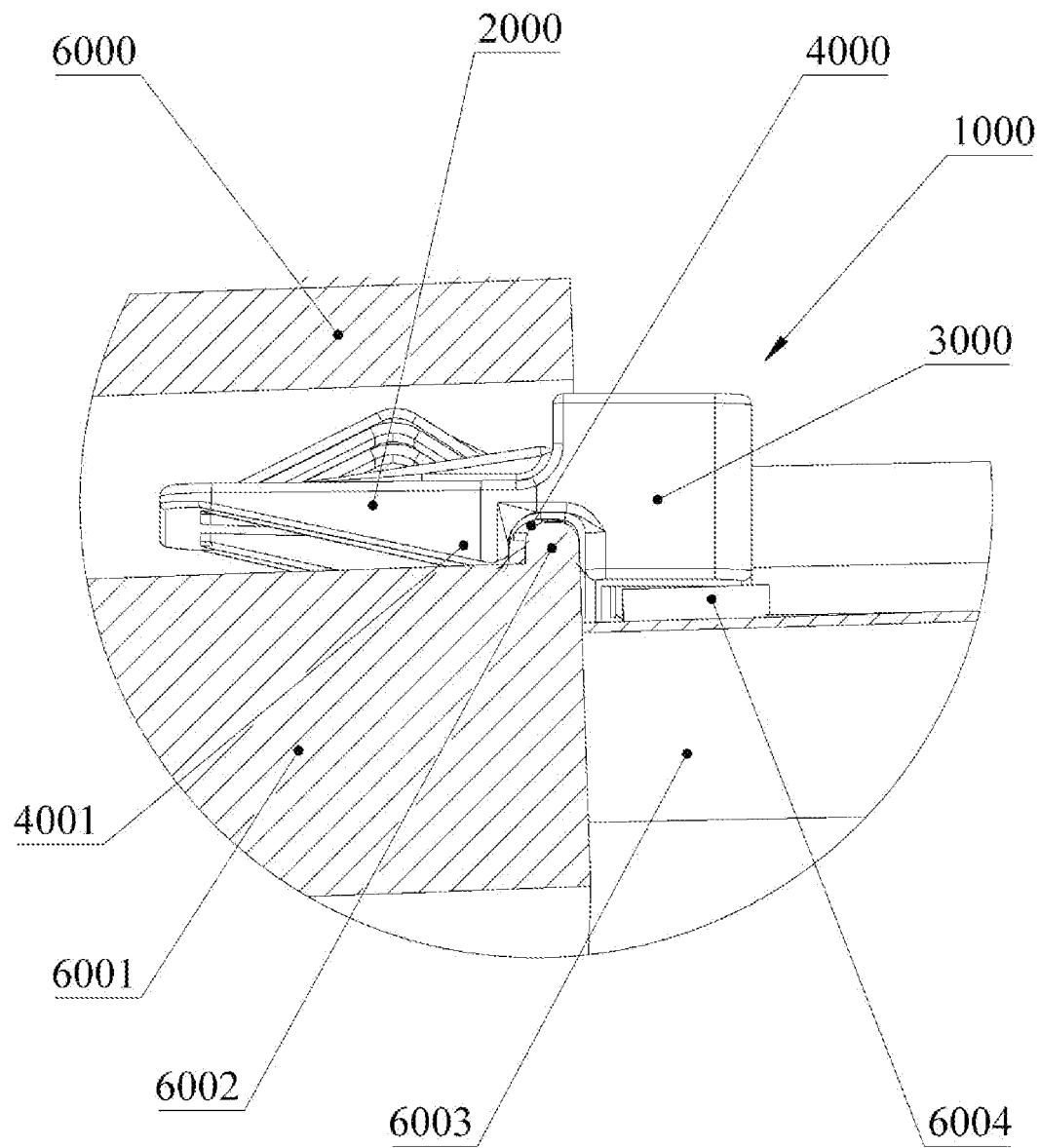
FIG. 10 is a cross-sectional view when the platform is applied to an automobile panoramic sunroof.

As shown in FIG. 10, when installing the platform 1000, first the interior trim panel 6001 around the automobile panoramic sunroof is pried open; the upper end face of the platform 1000 faces the sunroof, and the positioning part 2000 is inserted into the gap between the interior panel 6001 and the automotive sheet metal 6000; the platform 1000 is moved so that the edge 6002 of the interior trim panel is embedded in the clamping groove 4000; magnets 6004 are arranged around the sun visor to attract the magnets on the sun visor to the magnetic component on the platform.

Wherein, the periphery of the sun visor is provided with not only magnets 6004, but also metal members that are adsorbed by magnetic members, such as magnets, ferroalloys and any other desirable magnetic members.

Figure 9:
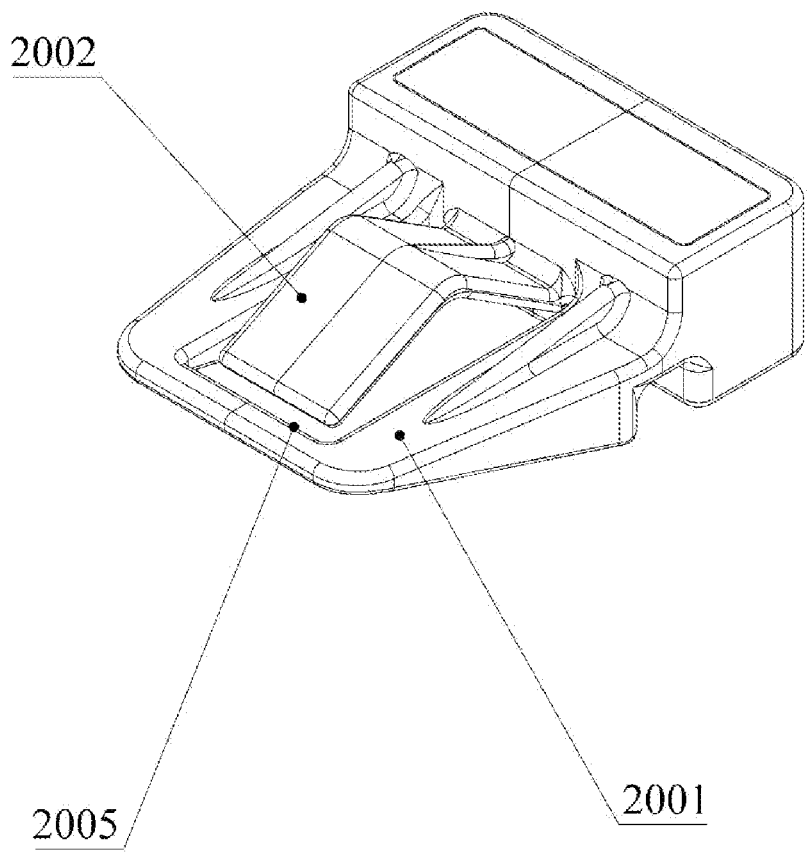
FIG. 9 is a schematic diagram of another embodiment of the platform.

As shown in FIG. 9, it is another embodiment provided by the present invention. In this embodiment, a through hole 2005 is formed in the base plate 2001, and a limit plate 2002 extends from the front end 2006 to the back end 2007, and the limit plate 2002 has a parabolic cross section.

The present invention also provides a shading method for an automobile panoramic sunroof, comprising: providing a mounting platform for a sunshade of an automobile panoramic sunroof and a sun visor;

wherein, said platform comprises a positioning part, a mounting part, a clamping groove arranged between said positioning part and said mounting part, and a magnetic component provided in the mounting part; and wherein said positioning part comprises a base plate comprising an upper end face and a lower end face, and at least one limit plate, wherein said base plate is further provided with at least one through hole having a front end and a rear end, wherein said limit plate is disposed above said upper end face and extends along a parabolic path from said front end towards said rear end; and wherein said mounting part comprises a top surface and a bottom surface, and said bottom surface is lower than said lower end face; and wherein the lower end face is provided with a blocking part comprising a starting end and a terminating end, wherein said terminating end is lower than said stating end, said terminating end extends in the direction of said lower end face and forms a terminating face; and wherein said terminating face, said lower end face and said mounting part form a clamping groove therebetween;

wherein magnets are arranged around said sun visor; and said shading method comprises the following steps:

prying up an interior trim panel around the automobile panoramic sunroof;

allowing the upper end face of said platform to face the sunroof, and inserting said positioning part into a gap between said interior trim panel and an automotive sheet metal;

moving said platform so that the edge of said interior trim panel is embedded in said clamping groove;

adsorbing the magnets on said sun visor to said magnetic component on said platform.

Wherein, a metal member which can be adsorbed by a magnetic member is arranged around said sun visor, for example, magnets, ferroalloys and any other desired magnetic parts.

Wherein, the interior trim panel around the automobile panoramic sunroof is pried open by a screwdriver, one end of the screwdriver is inserted into the gap between the interior trim panel and the automotive sheet metal, and a space sufficient for inserting the positioning part is pried open, and then the positioning part is inserted into the space.

Wherein when the positioning part is inserted into the gap between the interior trim panel and the automotive sheet metal, it is necessary to adjust the position of the platform so that the mounting part corresponds to the magnets on the sun visor.

The technical means disclosed in the solution of the present invention are not limited to the technical means disclosed in the above embodiments, but also include the technical solution composed of any combination of the above technical features. It should be pointed out that for those skilled in the art, several improvements and embellishments can be made without departing from the principle of the present invention, and these improvements and embellishments are also regarded as the protection scope of the present invention.

What is claimed is:

1. A mounting platform for a sunshade of an automobile panoramic sunroof, wherein said platform (1000) comprises a positioning part (2000), a mounting part (3000), a clamping groove (4000) arranged between said positioning part (2000) and said mounting part (3000), and a magnetic component (5000) provided in the mounting part (3000); and wherein said positioning part (2000) comprises a base plate (2001) comprising an upper end face (2003) and a lower end face (2004), and at least one limit plate (2002), wherein said base plate (2001) is further provided with at least one through hole (2005) having a front end (2006) and a rear end (2007), wherein said at least one limit plate (2002) is disposed above said upper end face (2003) and extends along a parabolic path from said front end (2006) towards said rear end (2007);

wherein said mounting part (3000) comprises a top surface (3001) and a bottom surface (3002), and said bottom surface (3002) is lower than said lower end face (2004); and wherein the lower end face (2004) is provided with a blocking part (4001) comprising a starting end (4002) and a terminating end (4003), wherein said terminating end (4003) is lower than said starting end (4002), said terminating end (4003) extends in a direction of said lower end face (2004) and forms a terminating face (4004);

wherein said terminating face (4004), said lower end face (2004) and said mounting part (3000) form the clamping groove (4000) therebetween;

wherein said at least one limit plate (2002) has a peak (2008), which is a highest turning point of said at least one limit plate (2002); and wherein, a first reinforcing rib (2009) is arranged on said at least one limit plate (2002), and said first reinforcing rib (2009) is formed by extending from said upper end face (2003) to said peak (2008).

2. The mounting platform for a sunshade of an automobile panoramic sunroof according to claim 1, wherein said mounting part (3000) further comprises a side surface (3003); and wherein, a second reinforcing rib (2010) is arranged between said mounting part (3000) and said upper end face (2003), and said second reinforcing rib (2010) extends from said side surface (3003) to said upper end face (2003).

3. The mounting platform for a sunshade of an automobile panoramic sunroof according to claim 1, wherein said mounting part (3000) further comprises a mounting cavity (3004) extending from said top surface (3001) to said bottom surface (3002); and wherein, said mounting cavity (3004) comprises a lower opening (3005), and said magnetic component (5000) is arranged in said mounting cavity (3004), wherein a transverse width of said magnetic component (5000) is greater than that of said lower opening (3005).

4. The mounting platform for a sunshade of an automobile panoramic sunroof according to claim 3, wherein said mounting part (3000) further comprises a mounting cover (3006) covering said mounting cavity (3004); and wherein, said mounting cover is provided with at least one fixing post (3007), said mounting part (3000) is provided with an assembly groove (3008), said assembly groove (3008) corresponds to said mounting cover (3006), and at least one fixing hole (3009) is arranged in said assembly groove (3008); and said at least one fixing hole (3009) corresponds to said at least one fixing post (3007).

5. The mounting platform for a sunshade of an automobile panoramic sunroof according to claim 1, wherein said magnetic component (5000) comprises a magnetic member (5001) and a protective shell (5002), which corresponds to said magnetic member (5001), and said protective shell (5002) is provided with an accommodating part (5003), and said magnetic component (5000) is arranged in said accommodating part.

6. The mounting platform for a sunshade of an automobile panoramic sunroof according to claim 1, wherein said blocking part (4001) comprises an inclined part (4005), and there is a certain angle α between said upper end face (2003) and said inclined part (4005), and a range of said angle α is $10° < α < 30°$.

7. A mounting platform for a sunshade of an automobile panoramic sunroof, wherein said platform (1000) comprises a positioning part (2000), a mounting part (3000), a clamping groove (4000) arranged between said positioning part (2000) and said mounting part (3000), and a magnetic component (5000) provided in the mounting part (3000); and wherein said positioning part (2000) comprises a base plate (2001) comprising an upper end face (2003) and a lower end face (2004), and at least one limit plate (2002), wherein said base plate (2001) is further provided with at least one through hole (2005) having a front end (2006) and a rear end (2007), wherein said at least one limit plate (2002) is disposed above said upper end face (2003) and extends along a parabolic path from said front end (2006) towards said rear end (2007); and wherein said mounting part (3000) comprises a top surface (3001) and a bottom surface (3002), and said bottom surface (3002) is lower than said lower end face (2004); and wherein the lower end face (2004) is provided with a blocking part (4001) comprising a starting end (4002) and a terminating end (4003), wherein said terminating end (4003) is lower than said starting end (4002), said terminating end (4003) extends in a direction of said lower end face (2004) and forms a terminating face (4004);

wherein said terminating face (4004), said lower end face (2004) and said mounting part (3000) form the clamping groove (4000) therebetween;

wherein said base plate (2001) comprises a first end (2011) and a second end (2012), wherein said first end (2011) is closer to said mounting part (3000) than is said second end (2012); and wherein a transverse width of said first end (2011) is greater than that of said second end (2012).

8. A mounting platform for a sunshade of an automobile panoramic sunroof, wherein said platform (1000) comprises a positioning part (2000), a mounting part (3000), a clamping groove (4000) arranged between said positioning part (2000) and said mounting part (3000), and a magnetic component (5000) provided in said mounting part (3000); and wherein, said positioning part (2000) comprises a base plate (2001) and at least one limit plate (2002), wherein said base plate (2001) comprises an upper end face (2003) and a lower end face (2004), and said at least one limit plate (2002) is arranged above said upper end face (2003) and has a parabolic cross section; and wherein, said mounting part (3000) comprises a top surface (3001), a bottom surface (3002) and a mounting cavity (3004), and said mounting cavity (3004) extends from said top surface (3001) to said bottom surface (3002), wherein said mounting cavity (3004) comprises a lower opening (3005), and said magnetic component (5000) is arranged in said mounting cavity (3004), wherein a transverse width of the magnetic component (5000) is greater than that of said lower opening (3005); and wherein said bottom surface (3002) is lower than said lower end face (2004); and wherein, said lower end face (2004) is provided with a blocking part (4001), and said blocking part (4001) comprises a starting end (4002) and a terminating end (4003), wherein said terminating end (4003) is lower than said starting end (4002), and said terminating end (4003) extends toward said lower end surface (2004) and forms a terminating face (4004); and wherein said terminating face (4004), said lower end face (2004) and said mounting part (3000) form the clamping groove (4000) therebetween.

9. The mounting platform for a sunshade of an automobile panoramic sunroof according to claim 8, wherein said base plate (2001) is further provided with at least one through hole (2005), and said at least one through hole (2005) has a front end (2006) and a rear end (2007), wherein said at least one limit plate (2002) is disposed above said upper end face (2003) and extends along a parabolic path from said front end (2006) towards said rear end (2007).

10. The mounting platform for a sunshade of an automobile panoramic sunroof according to claim 9, wherein said at least one limit plate (2002) has a peak (2008), which is a highest turning point of said at least one limit plate (2002); and wherein, a first reinforcing rib (2009) is arranged on said at least one limit plate (2002), and said first reinforcing rib (2009) is formed by extending from said upper end face (2003) to said peak (2008).

11. The mounting platform for a sunshade of an automobile panoramic sunroof e according to claim 8, wherein said mounting part (3000) further comprises a side surface (3003); and wherein, a second reinforcing rib (2010) is arranged between said mounting part (3000) and said upper end face (2003), and said second reinforcing rib (2010) extends from said side surface (3003) to said upper end face (2003).

12. The mounting platform for a sunshade of an automobile panoramic sunroof according to claim 8, wherein said mounting part (3000) further comprises a mounting cover (3006) covering said mounting cavity (3004); and wherein, said mounting cover is provided with at least one fixing post (3007), said mounting part (3000) is provided with an assembly groove (3008), said assembly groove (3008) corresponds to said mounting cover (3006), and at least one fixing hole (3009) is arranged in said assembly groove (3008); and said at least one fixing hole (3009) corresponds to said at least one fixing post (3007).

13. The mounting platform for a sunshade of an automobile panoramic sunroof according to claim 8, wherein said magnetic component (5000) comprises a magnetic member (5001) and a protective shell (5002), which corresponds to said magnetic member (5001), and said protective shell (5002) is provided with an accommodating part (5003), and said magnetic component (5000) is arranged in said accommodating part.

14. The mounting platform for a sunshade of an automobile panoramic sunroof according to claim 8, wherein said blocking part (4001) comprises an inclined part (4005), and there is a certain angle α between said upper end face (2003) and said inclined part (4005), and a range of said angle α is $10° < α < 30°$.

15. The mounting platform for a sunshade of an automobile panoramic sunroof according to claim 8, wherein said base plate (2001) comprises a first end (2011) and a second end (2012), wherein said first end (2011) is closer to said mounting part (3000) than is said second end (2012); and wherein a transverse width of said first end (2011) is greater than that of said second end (2012).

* * * * *